US012657487B2

(12) United States Patent     (10) Patent No.:   US 12,657,487 B2

Yue et al.     (45) Date of Patent:    Jun. 16, 2026

(54) ONLINE INFERENCE METHOD, SERVICE SYSTEM, AND DEVICE BASED ON AN ARTIFICIAL INTELLIGENCE GEOSPATIAL DATA CUBE

(71) Applicant: WUHAN UNIVERSITY, Hubei (CN)

(72) Inventors: Peng Yue, Hubei (CN); Kaixuan Wang, Hubei (CN); Hanwen Xu, Hubei (CN); Ruixiang Liu, Hubei (CN); Haoru Wu, Hubei (CN); Baoxin Teng, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 19/243,683

(22) Filed: Jun. 19, 2025

(65) Prior Publication Data

US 2026/0111767 A1     Apr. 23, 2026

(30) Foreign Application Priority Data

Oct. 18, 2024    (CN) .......................... 202411459487.X

(51) Int. Cl.
*G06N 5/04*       (2023.01)

(52) U.S. Cl.
CPC ..................................... *G06N 5/04* (2013.01)

(58) Field of Classification Search
None
See application file for complete search history.

(56) References Cited

U.S. PATENT DOCUMENTS

| | | | |
|---|---|---|---|
| 2021/0090328 A1 | 3/2021 | Laddha et al. | |
| 2021/0256407 A1 | 8/2021 | Therani et al. | |

FOREIGN PATENT DOCUMENTS

| | | |
|---|---|---|
| CN | 106682168 | 5/2017 |
| CN | 112181980 | 1/2021 |
| CN | 115879777 | 3/2023 |

OTHER PUBLICATIONS

Gao, et al., Deep learning for video object segmentation: a review, Artificial Intelligence Review, vol. 56, Apr. 8, 2022, pp. 457-531 (Year: 2022).*

(Continued)

*Primary Examiner* — Wilbert L Starks

(74) *Attorney, Agent, or Firm* — JCIP GLOBAL INC.

(57) ABSTRACT

The disclosure pertains to the field of data analysis and services, specifically to an online inference method, service system, and device based on an artificial intelligence geospatial data cube. The method involves constructing a cube organizational model based on a spatiotemporal grid, where the cube organizes and manages geospatial data and GeoAI models in a unified manner. It performs task-oriented model matching through a combination of explicit and implicit matching, where explicit matching converts user inference requests into multidimensional query conditions to retrieve candidate models, and implicit matching determines the optimal model by computing the feature similarity between inference data tiles and candidate models. Based on a distributed inference framework, an efficient inference workflow is executed in parallel across multiple computing nodes. The disclosure aims to address the limitations of existing technologies in multi-scenarios or large-scale spatial scenarios, such as low inference accuracy and slow inference speed.

13 Claims, 4 Drawing Sheets

(56)        References Cited

OTHER PUBLICATIONS

Ren, et al., Matching Algorithms: Fundamentals, Applications and
Challenges, arXiv:2103.03770v2 [cs.SI] Mar. 16, 2021, pp. 1-21 (
Year: 2021).*
Xue, et al., NEAT: Distilling 3D Wireframes from Neural Attraction
Fields, arXiv:2307.10206 [cs.CV], Jul. 14, 2023, pp. 1-15 (Year:
2023).*

* cited by examiner

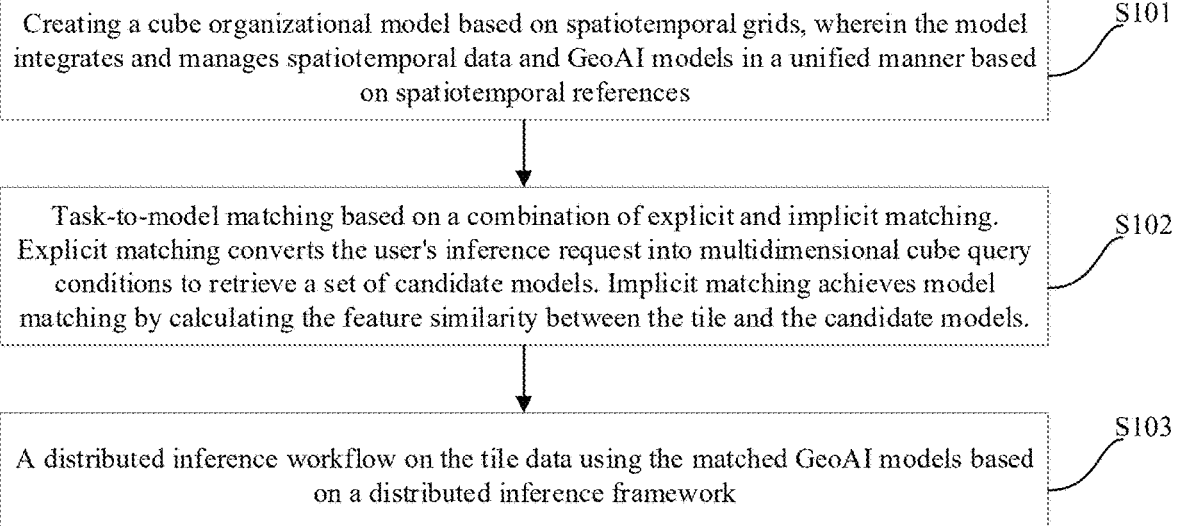

Creating a cube organizational model based on spatiotemporal grids, wherein the model integrates and manages spatiotemporal data and GeoAI models in a unified manner based on spatiotemporal references — S101

Task-to-model matching based on a combination of explicit and implicit matching. Explicit matching converts the user's inference request into multidimensional cube query conditions to retrieve a set of candidate models. Implicit matching achieves model matching by calculating the feature similarity between the tile and the candidate models. — S102

A distributed inference workflow on the tile data using the matched GeoAI models based on a distributed inference framework — S103

FIG. 1

Explicit matching extent(108.828°, 34.235°, 110.010°, 35.241°) & resolution = 10 time(2021-07-01, 2021-07-31)

task_class("semantic segmentation - forest land, cropland, built-up land, bare land, water bodies")

Cube query

Quality evaluation

Tile1    Model 1.1    Model 1.2    ......

Tile2    Model 2.1    Model 2.2    ......

TileN    Model n.1    Model n.2    ......

Candidate set of (Tile, Models)

Implicit matching

Tile1 → Feature extraction → Hash mapping → Similarity calculation → Optimal model Tile2 → Feature extraction → Hash mapping → Similarity calculation → Optimal model

......

TileN → Feature extraction → Hash mapping → Similarity calculation → Optimal model

Distributed inference

Tile1 → Pre-processing → Inference → Color mapping → Result1

Tile2 → Pre-processing → Inference → Color mapping → Result2

......

TileN → Pre-processing → Inference → Color mapping → ResultN

Tile stitching → edge smoothing → Final result

FIG. 3

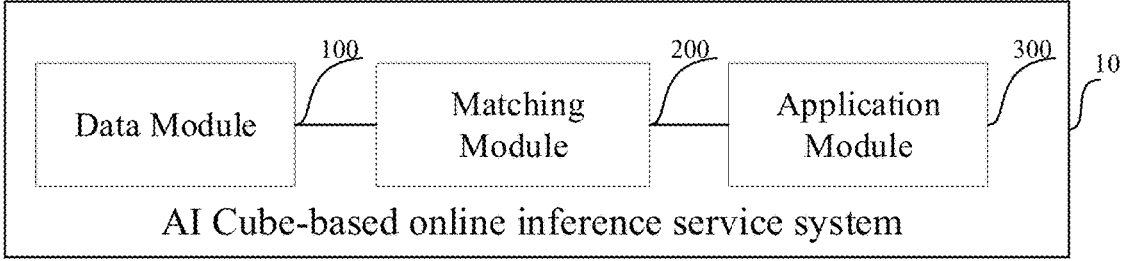

Data Module — 100    Matching Module — 200    Application Module — 300    10

AI Cube-based online inference service system

ONLINE INFERENCE METHOD, SERVICE SYSTEM, AND DEVICE BASED ON AN ARTIFICIAL INTELLIGENCE GEOSPATIAL DATA CUBE

CROSS-REFERENCE TO RELATED APPLICATION

This application claims the priority benefit of Chinese patent application No. 202411459487.X, filed on Oct. 18, 2024. The entirety of the above-mentioned patent application is hereby incorporated by reference herein and made a part of this specification.

BACKGROUND

Technical Field

The disclosure relates to the field of data analysis and service technology, and in particular, to an online inference method, service system, and device based on an artificial intelligence (AI) geospatial data cube (hereinafter referred to as 'AI Cube').

Description of Related Art

With the rapid growth of spatiotemporal data such as Earth observation (EO) data, the methods for processing spatiotemporal big data are also evolving. Existing spatiotemporal big data computing platforms, such as Google Earth Engine (GEE) and Open Data Cube (ODC), have successfully transformed the traditional local data analysis paradigm into an efficient online processing mode. These platforms construct spatiotemporal data cubes that seamlessly integrate multi-source data comprising raster, vector, and point cloud data. Within a unified spatiotemporal framework, they support large-scale, long-term online data processing and analysis.

However, although these cloud-based online computing platforms have made significant progress in data processing, challenges remain when performing artificial intelligence inference in multi-spatiotemporal or large-scale scenarios. Specifically, model performance is highly dependent on specific temporal and spatial conditions, making it difficult for a single model to comprehensively address all application scenarios. Additionally, the inference of massive remote sensing imagery involves high computational complexity, large data volumes, and high dimensionality, which imposes stringent requirements on computing resources and data processing capabilities.

SUMMARY

The disclosure provides an embodiment of an AI Cube-based online inference method, service system, and device, aiming to solve the issues of low inference accuracy and slow inference speed in single model inference under multi-spatiotemporal or large-scale scenarios in related technologies.

The first aspect of the disclosure provides an AI Cube-based online inference method, comprising the following steps:

Establishing a cube organizational model based on a spatiotemporal grid, wherein the cube organizational model integrates and manages spatiotemporal data and GeoAI models in a unified manner based on spatiotemporal references.

Performing a task-to-model matching based on a combination of an explicit matching and an implicit matching, wherein the explicit matching refers to converting a user's inference request into multidimensional query conditions of the cube organizational model to retrieve a candidate model set, and the implicit matching refers to performing a model matching by calculating a feature similarity between a tile to be inferred and candidate models.

Performing a distributed inference workflow on the tile data to be inferred using an AI model based on a distributed inference framework, wherein the tile data to be inferred is converted into distributed memory objects, and the AI model is deployed on various computing nodes to perform an inference workflow in parallel on the tile data to be inferred.

Optionally, the spatiotemporal data undergoes reprojection, resampling, and tiling operations before being ingested into the cube. The cube organizational model comprises dimension tables and fact tables. The fact table stores tile information and model information. The tile information comprises dimension indices, file paths where the tiles are located, the byte size of the tiles, and byte offsets. The model information comprises dimension indices and IDs of model metadata records. The dimension tables describe temporal and spatial attributes of tile facts, associated products, contained spectral bands, applicable temporal and spatial ranges of model facts, supported input data products and bands, applicable tasks and relevant classification categories.

Optionally, the task-to-model matching based on the combination of the explicit matching and the implicit matching comprises: acquiring an inference request input by a user, wherein the inference request comprises a task type, a classification category, a spatial range, a spatial resolution, and a temporal range; converting the user's inference request into dimensional query conditions, performing dimensional query based on the dimensional query conditions and the cube organizational model, and returning result sets, wherein the result sets comprise tile data under the spatiotemporal grid and a list of models available for a current inference task; calculating a comprehensive quality of each of the models in a model list, and selecting the models whose the comprehensive quality exceeds a given threshold as the candidate models. If the candidate models have no training dataset information, a model with the highest comprehensive quality and the tile data are selected as the optimal combination under the spatiotemporal grid. If the candidate models are associated with the training dataset information, the implicit matching is performed for the candidate model. For each of tile data, a corresponding model is traversed to calculate a similarity between the tile data and each of the models, and the model with the highest similarity is selected as a final model. For different tile data under the same spatiotemporal grid, a set of the tile data and a model with the highest model quality is selected as a final combination under a corresponding grid.

Optionally, the evaluation of a model quality takes into account a comprehensive consideration of model performance P, computational complexity C, and generalization capability G. The formula for calculating the overall quality Q is as follows:

$$Q = G \times \left( P \times \text{weight}_p - \left( \frac{C - C_{min}}{C_{max} - C_{min}} \right) \times \text{weight}_c \right)$$

wherein P is a F1 score index, C is a GFLOPs index, $C_{max}$ is a maximum C among the candidate models, $C_{min}$ is a minimum C among the candidate models, $weight_p$ is a computation weight of P, and $weight_c$ is a computation weight of C.

Optionally, implicit matching is performed for the candidate models, comprising: traversing a training dataset of models, and using a pre-trained deep learning model to extract feature vectors of each of samples, wherein the feature is a comprehensive description of texture, color, and semantics of the samples, represented as a d-dimensional vector. Performing a hash mapping for each of the feature vectors to construct a feature library, where a hash function used conforms to a locality-sensitive hash function. For each of result sets, using a pre-trained model to extract the feature vectors of the tile data. Then, the model list is traversed, and for each model, the corresponding hash function is used to compute the hash value of the tile data's feature vector. Samples with the same hash value are retrieved from the feature library, and the feature distance between the tile data and the samples is calculated. When the feature distance exceeds a threshold, the samples are identified as similar samples to the tile data, a proportion of the similar samples in an entire training dataset is then calculated, and a model with the highest proportion is selected as an optimal model for a current tile data.

Optionally, the distributed inference framework comprises Ray framework is used. The distributed inference workflow based on the Ray comprises reading of cube tile data, converting to memory objects, tile feature extraction and the implicit matching, pre-processing of the tiles to be inferred, distributed inference, and post-processing. The reading of the cube tile data and the implicit matching are performed in parallel based on multi-core CPUs, while the tile feature extraction, pre-processing of the tiles to be inferred, and distributed inference are performed in parallel based on a plurality of GPUs. To avoid exceeding hardware memory limitations, each of processing is performed in batches, with a maximum number of tiles determined by an available memory capacity of the CPUs or the plurality of GPUs. An inference workflow automatically applies different pre-processing and post-processing steps based on different inference task. For semantic segmentation tasks, the pre-processing comprises a mean normalization and a standard deviation normalization, the post-processing comprises color mapping and stitched edge smoothing. For object detection tasks, the pre-processing is the same as that for semantic segmentation, and the post-processing comprises removing duplicate detection boxes based on a weighted box fusion.

Optionally, a graphical user interface (GUI) and service interfaces are provided. The GUI allows users to interactively input inference conditions based on the preset webpages and provides on-the-fly inference mode and batch inference mode. The service interface allows external programs to access data services and inference services provided by an integrated system. Wherein the on-the-fly mode performs an inference on tile data within a spatial zoom and range of a current viewport. Each time the user zooms or pans a map, a new inference is triggered. The batch mode allows the users to perform inference tasks on large-scale data and allows the user to export inference results based on predefined spatiotemporal ranges and resolutions.

The second aspect of the disclosure provides an embodiment of an AI Cube-based online inference service system, comprising:

A data module, configured to establish a cube organizational model based on spatiotemporal grids, wherein the cube organizational model integrates and manages spatiotemporal data and GeoAI models in a unified manner based on spatiotemporal references.

A matching module, configured to perform a task-to-model matching based on a combination of an explicit matching and an implicit matching, wherein the explicit matching refers to converting the user's inference request into multidimensional query conditions of the cube organizational model to retrieve a set of candidate models, and the implicit matching refers to performing a model matching by calculating a feature similarity between a tile to be inferred and the candidate models. An application module, configured to perform a distributed inference workflow on the tile data to be inferred using an AI model based on a distributed inference framework, wherein the tile data to be inferred is converted into distributed memory objects, and the AI model is deployed on multiple computing nodes to execute an inference workflow in parallel on the tile data to be inferred.

The third aspect of the disclosure provides an embodiment of an electronic device, comprising a memory, a processor, and a computer program stored in the memory and executable on the processor, wherein the processor executes the program to implement an AI Cube-based online inference method as described in the above embodiments.

The fourth aspect of the disclosure provides an embodiment of a computer-readable storage medium, on which a computer program is stored. When executed by a processor, the program is used to implement the AI Cube-based online inference method as described in the above embodiments.

Accordingly, the disclosure comprises the following beneficial effects:

The embodiments of the disclosure achieve precise task-to-model matching by unifying and integrating spatiotemporal data with GeoAI models and employing an efficient combination of explicit and implicit matching mechanisms. Under a distributed inference framework, models are closely coupled with data, enabling parallel processing of tile data, which significantly improves inference efficiency and accuracy. Meanwhile, the proposed method optimizes system performance and enhances scalability, thereby facilitating the future development of spatiotemporal big data and GeoAI applications. Accordingly, the disclosure addresses technical challenges in the related art, such as low inference accuracy and slow inference speed when using a single model in multi-spatiotemporal or large-scale scenarios.

Additional aspects and advantages of the present application will be partially outlined in the following description, partially apparent from the description, or understood through the practice of the disclosure.

BRIEF DESCRIPTION OF THE DRAWINGS

The above-mentioned and/or additional aspects and advantages of the disclosure will become apparent and readily understood from the following description of the embodiments in conjunction with the accompanying drawings, in which:

FIG. 1 is a flowchart illustrating an AI Cube-based online inference method according to an embodiment of the disclosure.

FIG. 3 is a flowchart illustrating a use case of online AI inference based on AI Cube-based online inference method according to one embodiment of the disclosure.

FIG. 4 is a schematic diagram illustrating an AI Cube-based online inference service system according to an embodiment of the disclosure.

DETAILED DESCRIPTIONS OF THE EMBODIMENTS

Figure 2:
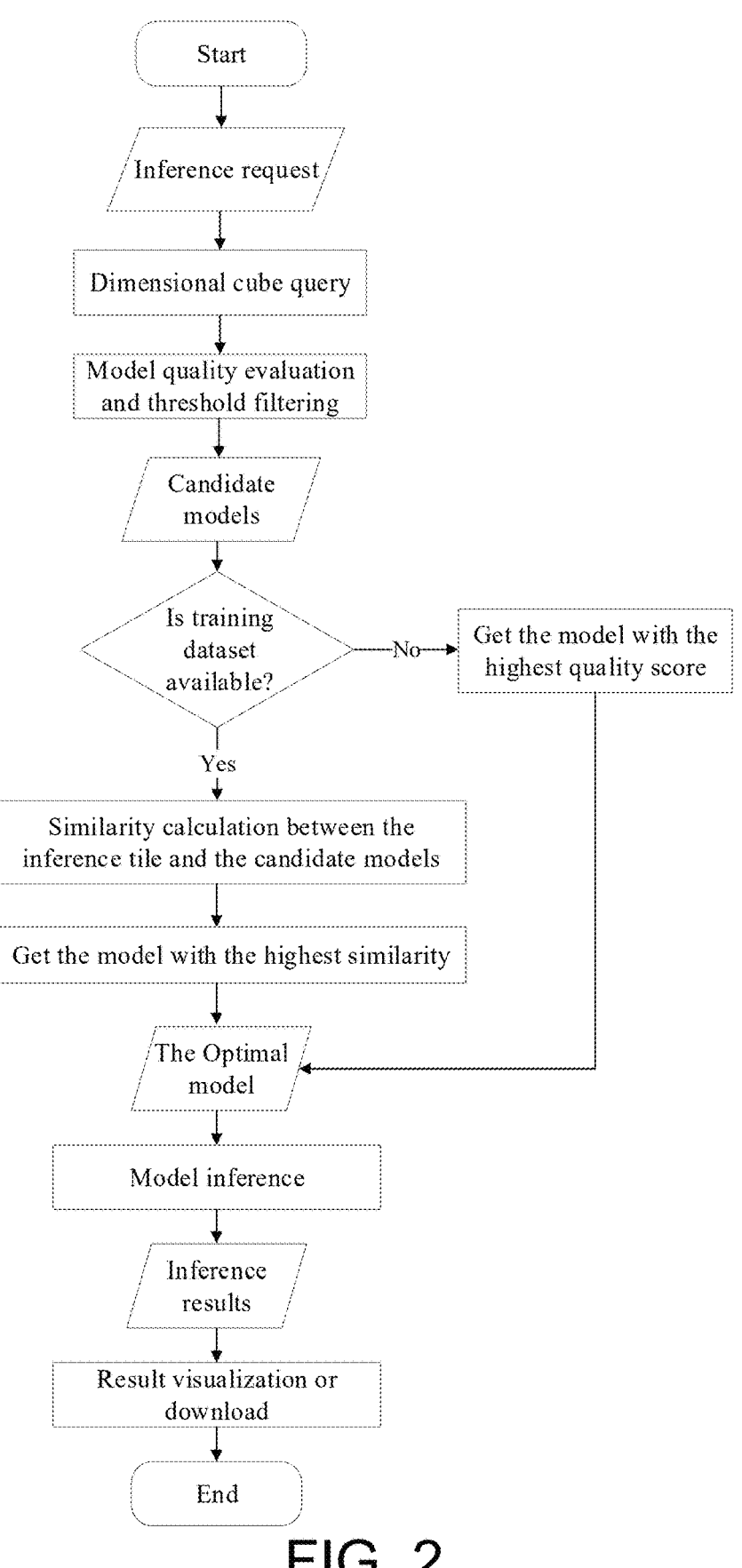
FIG. 2 is a flowchart illustrating an AI Cube-based online inference method according to one embodiment of the disclosure.

The embodiments of the disclosure are described in detail below. Examples of the embodiments are illustrated in the accompanying drawings, in which the same or similar reference numerals throughout represent the same or similar elements or elements having the same or similar functions. The embodiments described below with reference to the drawings are exemplary and are intended to explain the disclosure rather than to limit it.

The AI Cube-based online inference method, service system, and device according to the embodiments of the disclosure are described below with reference to the accompanying drawings. To address the lack of GeoAI inference capability in multi-spatiotemporal or large-scale scenarios mentioned in the background, the disclosure provides an AI Cube-based online inference method.

In this method, by uniformly integrating geospatial data with GeoAI models and leveraging efficient explicit and implicit matching mechanisms, precise matching between inference tasks and models is achieved. Based on the distributed inference framework, tile data is processed and inferenced in parallel, which significantly improves inference efficiency. Compared with inference using a single model, multi-model inference improves the accuracy of the results. Meanwhile, the method optimizes system performance, enhances scalability, and contributes to the advancement of geospatial big data and GeoAI applications in the future. The disclosure resolves the issues of low inference accuracy and slow inference speed of a single model in multi-spatiotemporal or large-scale scenarios in related technologies.

Specifically, FIG. 1 is a schematic flow diagram of the AI Cube-based online inference method provided in the embodiment of the disclosure.

As shown in FIG. 1, the method comprises the following steps:

In step S101, a cube organizational model is established based on spatiotemporal grids, wherein the cube organizational model integrates and manages spatiotemporal data and GeoAI models in a unified manner based on spatiotemporal references.

The spatiotemporal grid refers to a grid system used for organizing and indexing spatiotemporal data. The cube organizational model refers to a data and model organization framework based on the spatiotemporal grid. The spatiotemporal reference serves as a reference framework for organizing and indexing spatiotemporal data and models, including spatial reference and temporal reference.

It can be understood that the embodiment of the disclosure realizes unified and efficient management of spatiotemporal data and GeoAI models through the cube organizational model established based on spatiotemporal grids, thereby providing strong technical support and a solid data foundation for GeoAI applications.

In the embodiment of the disclosure, when spatiotemporal data enters the cube, it undergoes reprojection, resampling, and tile partitioning operations. The cube organizational model comprises dimension tables and fact tables. The fact tables store tile information and model information. The tile information comprises dimension indices, the file path where the tile is located, the number of bytes of the tile, and the byte offset. The model information comprises a dimension index and the IDs of the model metadata record. The dimension tables describe attributes related to tile facts, including time, space, associated product, contained spectral bands, and attributes related to model facts, such as applicable temporal range, applicable spatial range, supported input data products and bands, applicable tasks, and involved classification categories.

It can be understood that, in the embodiment of the disclosure, spatiotemporal data is integrated into the cube organizational model through reprojection, resampling, and tile partitioning. The model consists of dimensions tables and fact tables. The fact tables store tile and model information, facilitating efficient access and transmission, while the dimension tables provide rich contextual information to support accurate matching and inference analysis.

Specifically, data products from various remote sensing satellites are collected, including GF-2, BJ-2, and Sentinel-2. Meanwhile, multiple GeoAI models for geospatial inference tasks are integrated, covering land use/land cover (LULC) classification, single-class cover extraction, object detection, and change detection. Each model is attached with a standardized description. The cube organizational model uses EPSG: 3857 as the spatial reference and is divided into 0-24 pyramid levels. In the temporal dimension, Coordinated Universal Time (UTC) is adopted as the reference, and the temporal grid is refined to the second level to capture fine-grained temporal variations.

During the data import process, the remote sensing data is first subjected to reprojection to ensure it matches the selected spatial reference. Next, efficient methods such as nearest neighbor interpolation or bilinear interpolation are used for resampling the data to match the resolution of the closest pyramid level. Finally, based on the tile partitioning rules of that level, the processed data is divided into several tiles and stored in COG (Cloud Optimized GeoTIFF) format in MinIO which is a high-performance object storage system.

When importing data and models into the cube, fact tables and dimension tables are constructed based on tile information and model metadata. The cube comprises two fact tables, respectively used for storing tile data and model information. In addition, three dimension tables are established to describe, in detail, the temporal and spatial attributes, associated products, and bands of tile facts. These dimension tables also comprehensively characterize the temporal and spatial applicability of models, the applicable spatial data products and bands. Furthermore, another dimension is introduced to describe the types of tasks served by the models and the corresponding classification schemes involved.

In the embodiment of the disclosure, the Geospatial Data Abstraction Library (GDAL) is utilized to perform tile reprojection, resampling, and slicing operations. MinIO is adopted as the storage solution to ensure efficient tile data access and scalability. Model files are also stored in MinIO, while their metadata is stored in a structured manner using the relational database PostgreSQL. The model fact table is responsible for linking dimension indices with the IDs of the model metadata records, thereby enabling fast indexing and access to model information.

In S102, model matching is performed based on a combination of explicit matching and implicit matching. Explicit matching involves converting the user's inference request into multidimensional cube query to retrieve a candidate model set. Implicit matching, which is a further process of precise matching, is achieved by calculating the feature similarity between the tile to be inferred and the candidate model.

The explicit matching may be a method that directly converts the user inference request into query conditions to retrieve a set of candidate models, while the implicit matching may be a method that selects models based on feature similarity.

It can be understood that, in the embodiment of the disclosure, explicit matching converts the user inference request into multidimensional query conditions to efficiently retrieve a set of candidate models. Implicit matching further computes the feature similarity between the candidate models and the GeoAI models to identify the optimal model. By combining explicit and implicit matching, precise matching between tasks and models is achieved, thereby ensuring the reliability of the inference results.

In the embodiment of the disclosure, task-to-model matching is performed based on a combination of explicit and implicit matching, including: acquiring an inference request input by the user, wherein the inference request comprises a task type, classification category, spatial extent, spatial resolution, and temporal range; converting the inference request into dimensional query conditions, performing dimensional queries on the cube organizational model based on the query conditions, and returning a result set, wherein the result set comprises tile data under the spatiotemporal grid and a list of models available for the current inference task; calculating the overall quality of each model in the list, and selecting models with quality scores exceeding a predefined threshold as candidate models. If the candidate models do not contain training dataset information, the model with the highest overall quality and corresponding tile data is selected as the optimal combination under the current spatiotemporal grid. If the candidate models contain training dataset information, implicit matching is performed by traversing the models associated with each tile and computing the similarity between the tile and each model. The model with the highest similarity is selected as the final model. For different tile data under the same spatiotemporal grid, the combination of tile data and model with the highest model quality is selected as the final combination under the corresponding grid.

It can be understood that, in the embodiment of the disclosure, the multidimensional inference request input by the user is parsed and converted into dimensional query conditions of the cube organizational model, enabling efficient retrieval of tile data and available models under the spatiotemporal grid. Candidate models are preliminarily screened based on their overall quality, and further implicit matching is performed depending on whether training dataset information is available, in order to select the most suitable combination of model and tile data. Ultimately, for different tile data within the same spatiotemporal grid, the optimal data-model combination is selected, thereby improving the efficiency and accuracy of executing geospatial intelligence tasks.

Specifically, the detailed steps for model matching based on the combination of explicit matching and implicit matching are as follows:

Step1.1: The user inputs an inference request, which comprises task type, classification category, spatial range, spatial resolution, and time range. For non-classification tasks, the classification category can be left empty.

Step1.2: The user's inference request is converted into dimension query conditions, i.e., task-class conditions, spatial conditions, and temporal conditions. Based on these dimension conditions, a multidimensional query is performed on the cube, returning a (tile, models) set. Here, tile represents the tile data under a specific spatiotemporal grid, and models refers to the list of models available for the tile for the current inference task.

Step1.3: The overall quality of each model in the model list is calculated, and models with overall quality exceeding a given threshold are selected as candidate models. If the candidate model lacks training dataset information, the model with the highest overall quality and the tile are selected as the optimal combination for that spatiotemporal grid. If the model's training dataset is available, proceed to Step1.4.

Step1.4: Perform implicit matching on the (tile, models) after Step1.3. For each tile, traverse its corresponding models and calculate the similarity between the tile and each model. The model with the highest similarity is selected as the final model.

Step1.5: For different tiles within the same spatiotemporal grid, select the (tile, model) pair with the highest model quality as the final combination for that grid.

In the embodiment of the disclosure, the evaluation of model quality takes into account a comprehensive consideration of model performance (P), computational complexity (C), and generalization capability (G). The formula for calculating the overall quality (Q) is as follows:

$$Q = G \times \left( P \times \text{weight}_p - \left( \frac{C - C_{min}}{C_{max} - C_{min}} \right) \times \text{weight}_c \right)$$

where P is the F1 score index, C is the GFLOPs index, $C_{max}$ is the maximum C among the candidate models, $C_{min}$ is the minimum C among the candidate models, $\text{weight}_p$ is the computation weight of P, and $\text{weight}_c$ is the computation weight of C.

It should be noted that in the on-the-fly inference mode, $\text{weight}_p = 0.7$ and $\text{weight}_c = 0.3$, while in the batch inference mode, $\text{weight}_p = 0.9$ and $\text{weight}_c = 0.1$.

In the embodiment of the disclosure, implicit matching of candidate models comprises traversing the training dataset of the models and using a pre-trained deep learning model to extract feature vectors for each sample. The features are a comprehensive representation of the sample's texture, color, semantics, etc., and are represented as a d-dimensional vector. A hash mapping is performed on each feature vector to construct a feature library, where the hash function used follows the characteristics of a locality-sensitive hash function. For each result set, the pre-trained model is used to extract feature vectors of the tile data. Then, the model list is traversed, and for each model, the corresponding hash function is used to calculate the hash value of the feature vector of the tile data. The sample with the same hash value is found in the feature library, and the feature distance between the tile data and the sample is calculated. When the feature distance exceeds a threshold, the sample is identified as a similar sample to the tile data, and the proportion of similar samples in the entire training dataset is computed. The model with the highest proportion is selected as the best model applicable to the current tile data.

It can be understood that, in the embodiment of the disclosure, feature vectors are extracted using deep learning models and mapped via hashing to construct a feature library. Cosine distance is then used to evaluate the similarity between tile data and model training samples. The model with the highest similarity is ultimately selected as the best-matched model, thereby achieving an efficient and accurate model-to-data matching process.

Specifically, the detailed steps for performing implicit matching on candidate models are as follows:

Step2.1: When the model is imported into the cube, the model features are first extracted and stored in the feature library. The specific method is to traverse the model's training dataset and use a pre-trained deep learning model to extract the features of each sample. The feature is a comprehensive representation of the sample's texture, color, semantics, and other attributes, where each feature is a d-dimensional vector.

Step2.2: Then, a hash mapping is performed on each feature vector, using random projection as the locality-sensitive hash function for cosine distance. The definition is as follows:

Randomly generate n vectors, $\vec{r}_1, \vec{r}_2 \ldots, \vec{r}_n \in R^D$ each from a normal distribution $\mathcal{N}(0, 1)$ in $R^D$, with dimension D. For each feature vector $\vec{v} \in R^D$, its hash value $h(\vec{v})$ is calculated as:

$$h(\vec{v})=(\text{heaviside}(\vec{r}_1, \vec{v}),\text{heaviside}(\vec{r}_2, \vec{v}), \ldots ,\text{heaviside}(\vec{r}_n, \vec{v}))$$

Where heaviside(x) is the Heaviside step function used to extract the sign of the real number x:

$$\begin{cases} \text{heaviside}(x) = 1, x \geq 0 \\ \text{heaviside}(x) = 0, x < 0 \end{cases}$$

The resulting hash value is a binary code consisting of n combinations of 0 and 1, each with a length of D. The random vectors and the hash values of each sample are stored in the feature library corresponding to the model.

Step2.3: For each (tile, models), the pre-trained model is used to extract the feature vector of the tile. Then, the model list is traversed, and for each model, the corresponding n random D-dimensional vectors are used to compute the hash value of the tile feature vector. Afterward, the sample with the same hash value is found in the feature library. The cosine distance between the tile and the sample is then calculated using the formula:

$$CosineDistance(\vec{x}, \vec{y}) = \frac{\vec{x} \cdot \vec{y}}{\|\vec{x}\|\|\vec{y}\|}$$

Given a distance threshold, when the cosine distance exceeds the threshold, the tile and the sample are considered similar. The proportion of similar samples within the entire training dataset is then calculated. After traversing all models, the model with the highest proportion is selected as the best model for the current tile, resulting in the (tile, model) combination.

In S103, an inference workflow is performed on the tile data to be inferred based on the distributed inference framework. The tile data is converted into distributed memory objects, and the GeoAI models are deployed on various computing nodes to execute the inference workflow in parallel.

The distributed inference framework may be an inference system that supports parallel computing and distributed processing. The tile data to be inferred refers to spatiotemporal data fragments that require GeoAI inference.

It can be understood that, in this embodiment of the disclosure, by converting tile data into distributed memory objects and deploying GeoAI models across multiple computing nodes in a distributed manner, a parallel inference workflow is implemented. This enables efficient processing of geospatial data, improves data processing efficiency, and provides a new approach for intelligent processing of geospatial data.

In the embodiment of the disclosure, the distributed inference framework comprises Ray framework. The distributed inference workflow based on the Ray comprises cube tile data loading, memory object conversion, tile feature extraction and implicit matching, pre-processing, model inference, and post-processing. The cube tile data loading and implicit matching are executed in parallel using multiple CPU cores, while tile feature extraction, pre-processing, and model inference are performed in parallel using multiple GPUs. To avoid exceeding hardware memory limitations, each processing operation handles the maximum number of tiles permitted by the available CPU/GPU memory capacity. The inference workflow automatically applies different pre-processing and post-processing procedures based on the type of inference task. For semantic segmentation tasks, the pre-processing comprises mean normalization and standard deviation normalization, while the post-processing comprises color mapping and edge optimization for tile stitching. For object detection tasks, the pre-processing is consistent with that of semantic segmentation, and the post-processing involves duplicate detection box removal based on weighted box fusion.

It can be understood that in the embodiment of the disclosure, an inference workflow is developed based on Ray. This workflow optimizes different inference tasks through automated pre-processing and post-processing, and flexibly allocates GPU resources to improve processing efficiency and scalability, making it suitable for intelligent analysis of large-scale geospatial data.

It should be noted that the GPU resource allocation method comprises the following: the Ray framework allows the allocation of a portion of GPU resources to a single worker node, where the parameters set are logical values. When the task exceeds the allocated resources, it will automatically occupy the available resources. Based on this feature, an optimal GPU resource allocation method is implemented, specifically as follows:

First, a relatively low number of GPU resources is allocated to each worker node, and the number of worker nodes is gradually increased. When the execution time begins to stabilize, it indicates that the GPU resources have been sufficiently utilized under the current number of worker nodes. The optimal number of GPU resources per worker node is approximately the total number of GPU resources divided by the number of worker nodes.

In the embodiment of the disclosure, it also comprises: providing a GUI and service interfaces. The GUI allows users to interactively input inference conditions on a preset page, offering both on-the-fly inference mode and batch inference mode. The service interface enables external programs to access data services and inference services provided by the integrated system. In on-the-fly inference mode, inference is performed on the tile data within the spatial level and range of the current viewport, with new inference triggered each time the user zooms the map or moves the layers. In batch inference mode, users can perform large-scale data inference tasks, allowing them to export inference results based on a preset spatiotemporal range and resolution.

It can be understood that in the embodiment of the disclosure, the GUI provides both on-the-fly and batch processing inference modes, allowing users to interactively input inference conditions. Meanwhile, the service interface supports external programs to integrate data services and inference services, enabling flexible data processing and inference capabilities.

According to AI Cube-based online inference method proposed in the embodiment of the disclosure, by uniformly integrating spatiotemporal data and GeoAI models, and leveraging efficient explicit and implicit matching mechanisms, precise matching between tasks and models is achieved. Under the distributed inference framework, models and data are closely associated, and tile data is processed in parallel, significantly improving inference efficiency. Meanwhile, the system performance is optimized, and scalability is enhanced, which facilitates the future development of spatiotemporal big data and GeoAI applications. As a result, the problems of low inference accuracy and slow inference speed of a single model in multi-temporal or large-scale scenarios in the related art are solved.

The AI Cube-based online inference method will now be specifically described with reference to FIG. 2. The input inference request is: "Obtain LULC classification results for the entire target area in July 2021, with a spatial resolution of 10 meters. The classification categories include forest land, cropland, built-up land, bare land, and water bodies." This request is initiated via the GUI of the web platform, with the content as follows:

S1. The user inputs an inference request with the task type set to "LULC classification," classification categories specified as "forest land, cropland, built-up land, bare land, and water bodies," spatial extent specified as "the entire target area", spatial resolution set to "10 meters," and the time range specified as "Jul. 1, 2021-Jul. 31, 2021".

S2. The user's inference request is converted into dimensional query conditions. Based on these dimensional query conditions, a cube query is performed. The result returns a set of (tile, models) pairs that meet the above query conditions.

S3. The comprehensive quality of each model in the model list is calculated, and models whose comprehensive quality exceeds a predefined threshold are selected as candidate models. The model quality evaluation comprehensively considers model performance (P), computational complexity (C), and generalization capability (G). The formula for calculating the overall quality (Q) is as follows:

$$Q = G \times \left( P \times \text{weight}_p - \left( \frac{C - C_{min}}{C_{max} - C_{min}} \right) \times \text{weight}_c \right)$$

where P is the F1 score index, C is the GFLOPS index, $C_{max}$ is the maximum C among the candidate models, $C_{min}$ is the minimum C among the candidate models, $\text{weight}_p$ is the computation weight of P, and $\text{weight}_c$ is the computation weight of C. $G \in [0,1]$. The embodiment uses the batch mode, therefore $\text{weight}_p=0.9$ and $\text{weight}_c=0.1$.

All candidate models have the available training dataset and thus proceed to S4.

S4. Perform implicit matching on the (tile, models) set obtained from S3. For each tile, traverse its corresponding models and compute the similarity between the tile and each model. The model with the highest similarity is selected as the final model. Here, the similarity is defined as the proportion of samples in the model's training dataset that are similar to the tile, relative to the total number of samples in the dataset. To accelerate the matching process, a locality sensitive hashing method is employed to convert the operation into a nearest neighbor search over the model training datasets.

It should be noted that the selection of the final model comprises the following steps:

S4.1. During model import into the cube, model features are first extracted and stored in the feature repository. Specifically, this is achieved by traversing the training dataset of each model and using a pre-trained deep learning model, ResNet, to extract features from each sample. Each feature is represented as a d-dimensional vector, where d=2048.

S4.2. Then, a hash mapping is performed on each feature vector, using random projection as the locality-sensitive hash function for cosine distance. The definition is as follows: Randomly generate n vectors, $\vec{r}_1, \vec{r}_2, \ldots, \vec{r}_n \in R^D$ each from a normal distribution $\mathcal{N}(0, 1)$ in $R^D$, with dimension D. For each feature vector $\vec{v} \in R^D$, its hash value $h(\vec{v})$ is calculated as:

$$h(\vec{v}) = (\text{heaviside}(\vec{r}_1, \vec{v}), \text{heaviside}(\vec{r}_2, \vec{v}), \ldots, \text{heaviside}(\vec{r}_n, \vec{v}))$$

Where heaviside(x) is the Heaviside step function used to extract the sign of the real number x:

$$\begin{cases} \text{heaviside}(x) = 1, \, x \geq 0 \\ \text{heaviside}(x) = 0, \, x < 0 \end{cases}$$

The resulting hash value is a binary code consisting of n combinations of 0 and 1, each with a length of D. Here, n=2, D=15. The random vectors and the hash values of each sample are stored in the feature library corresponding to the model.

S4.3. For each (tile, models), the pre-trained model is used to extract the feature vector of the tile. Then, the model list is traversed, and for each model, the corresponding two random 15-dimensional vectors are used to compute the hash value of the tile feature vector. Afterward, the sample with the same hash value is found in the feature library. The cosine distance between the tile and the sample is then calculated using the formula:

$$CosineDistance(\vec{x}, \vec{y}) = \frac{\vec{x} \cdot \vec{y}}{\|\vec{x}\| \|\vec{y}\|}$$

Given a distance threshold=0.9, when the cosine distance exceeds the threshold, the tile and the sample are considered similar. The proportion of similar samples within the entire training dataset is then calculated. After traversing all models, the model with the highest proportion is selected as the best model for the current tile, resulting in the (tile, model) combination.

S5. For different tiles within the same spatiotemporal grid, the (tile, model) pair with the highest model quality is selected as the final combination for that grid.

S6. Each tile is processed using the selected model through distributed inference. The inference engine is developed based on the distributed inference framework Ray, and implements a complete inference workflow, which comprises cube tile data loading, memory object conversion, tile feature extraction and implicit matching, pre-processing of tiles to be inferred, distributed inference, and post-processing. Among these, the distributed loading of cube tile data and implicit matching are executed in parallel using multi-core CPUs, while tile feature extraction, pre-processing, and distributed inference are executed in parallel using multiple GPUs. To avoid exceeding hardware memory limitations, each processing batch is limited to the maximum number of tiles that can be handled within the available CPU/GPU memory capacity. In this embodiment, the task is of the semantic segmentation type. The pre-processing stage comprises mean normalization and standard deviation normalization, while the post-processing stage comprises color mapping and edge refinement after tile stitching. Each distributed GPU computing node is assigned 0.2 GPU resources.

S7. The inference results are output in PNG format, and the file URLs are returned to the frontend for visualization display.

In summary, the embodiment of the present application employs a fact constellation schema-based cube to manage spatiotemporal data and models, automatically selects the optimal data and model through intelligent matching algorithms, and achieves efficient parallel inference by leveraging a distributed inference framework, thereby improving the speed and accuracy of large-scale spatiotemporal inference.

FIG. 3 shows a detailed explanation of the AI Cube-based online inference method proposed in the disclosure through a use case. The cube organizational model has been created as described in S101 and integrated with data from various remote sensing satellites, including GF-2, BJ-2, and Sentinel-2. Multiple GeoAI models for geospatial inference tasks are also integrated, covering LULC classification, single-class cover extraction, object detection, and change detection. In this embodiment, user's inference request is "Obtain the LULC classification results for the area within the latitude and longitude range (108.828°, 34.235°) to (110.010°, 35.241°) in July 2021 at a spatial resolution of 10 meters, with categories including forest land, cropland, built-up land, bare land, and water bodies." This request is initiated through the GUI of the web platform. The online inference process proceeds through the main steps: explicit matching, implicit matching and distributed inference.

S1. Explicit matching:

The user inputs an inference request with the task type set to "LULC classification," classification categories specified as "forest land, farmland, built-up land, bare land, and water bodies," spatial extent specified as "[108.828°, 34.235°, 110.010°, 35.241°]" spatial resolution set to "10 meters," and the time range specified as "Jul. 1, 2023-Jul. 31, 2023".

The user's inference request is converted into dimensional query conditions. Based on these conditions, a cube query is performed on the cube, returning a set of (tile, models). Calculate the overall quality of each model in the model list and select the models whose overall quality exceeds a given threshold as candidate models. In this embodiment, it is in batch inference mode, thus $weight_p=0.9$ and $weight_c=0.1$.

All candidate models have available training datasets, and the process proceeds to implicit matching.

S2. Implicit matching:

Implicit matching is performed on the (tile, models) pairs from explicit matching. For each (tile, models), the feature vector of the tile is extracted using the pre-trained model ResNet. Then, for each model, the hash value of the tile's feature vector is first calculated. Afterward, samples with the same hash value are found in the feature library, and the cosine distance between the tile and the sample is calculated. The threshold of 0.9 is set, and when the cosine distance is greater than this threshold, the tile and the sample are considered similar. The proportion of similar samples within the entire dataset is then calculated. After traversing all models, the model with the highest proportion is selected as the best model for the current tile, resulting in the final (tile, model) pair. For different tiles within the same spatiotemporal grid, the (tile, model) pair with the highest model quality is selected as the final combination for that grid.

S3. Distributed inference:

For each tile, distributed inference is performed using the selected models. This embodiment involves semantic segmentation tasks and each tile undergoes pre-processing, inference, and post-processing. Pre-processing comprises mean normalization and standard deviation normalization to standardize the input data before inference. Post-processing primarily involves color mapping to enhance visualization of the classification results. After aggregating all generated results, tile stitching and edge smoothing are applied to produce the final result output. The inference results are output in PNG format, and the file URL is returned to the frontend for visualization display. In this embodiment, each distributed GPU computation node is allocated 0.2 GPU resources and 1 CPU core.

Next, with reference to the accompanying drawings FIG. 4, the AI Cube-based online inference service system proposed in the embodiment of the present application will be described.

As shown in FIG. 4, the AI Cube-based online inference service system 10 comprises: a data module 100, a matching module 200, and an application module 300.

The data module 100 is used to establish the cube organizational model based on the spatiotemporal grid. The cube organizational model unifies the management of spatiotemporal data and GeoAI models based on the spatiotemporal references. The matching module 200 is used for task-model matching based on explicit matching and implicit matching. Explicit matching involves converting the user's inference request into multi-dimensional query conditions for the cube organizational model to retrieve a candidate model set. Implicit matching is achieved by calculating the feature similarity between the tiles to be inferred and the candidate models to perform the model matching. The application module 300 is used to perform distributed inference workflows on the tiles to be inferred based on a distributed inference framework. In this process, the tiles to be inferred are converted into distributed memory objects, and the GeoAI models are deployed on various computing nodes to perform parallel inference workflows on the tiles to be inferred.

It should be noted that the explanations of the embodiments of the AI Cube-based online inference method provided above are also applicable to the AI Cube-based online inference service system in this embodiment, and will not be repeated here.

According to the AI Cube-based online inference service system proposed in the embodiment of the disclosure, by uniformly integrating spatiotemporal data and GeoAI models, and leveraging efficient explicit and implicit matching mechanisms, precise matching between tasks and models is achieved. Under the distributed inference framework, models and data are closely associated, and tile data is processed in parallel, significantly improving inference efficiency. Meanwhile, the system performance is optimized, and scalability is enhanced, which facilitates the future development of spatiotemporal big data and GeoAI applications. As a result, the problems of low inference accuracy and slow inference speed of a single model in multi-temporal or large-scale scenarios in the related art are solved.

Figure 5:
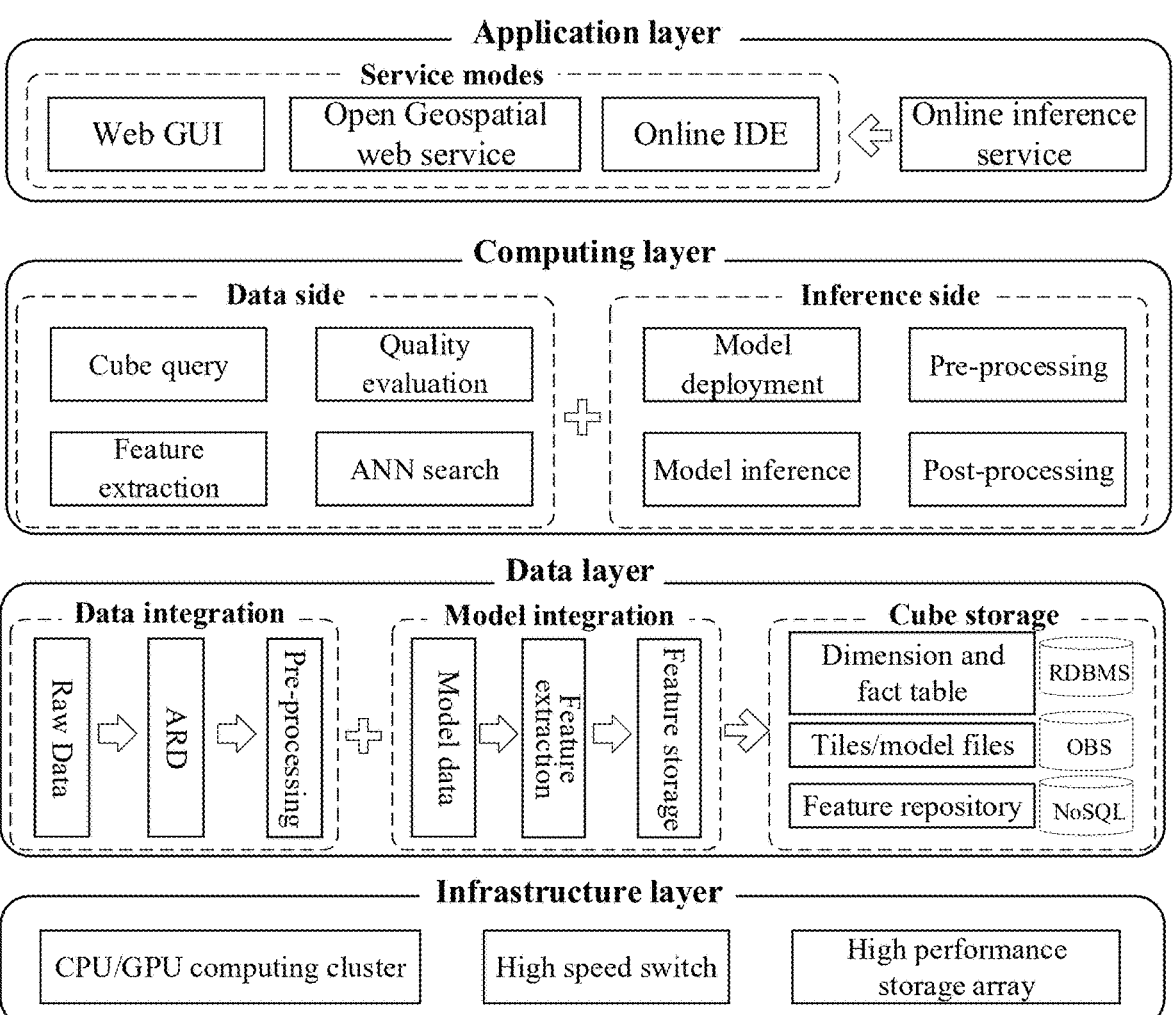
FIG. 5 is a schematic diagram illustrating an AI Cube-based online inference service system according to one embodiment of the disclosure.

The AI Cube-based online inference service system will be explained in detail in conjunction with FIG. 5, as follows:

The AI Cube-based online inference service system can include an infrastructure layer, a data layer, a computing layer, and an interface layer. These layers collaborate with each other to support the powerful online inference service capabilities.

The infrastructure layer consists of high-performance CPU/GPU compute clusters, high-speed fiber optic switches, and large-capacity, high-performance storage arrays. This layer not only ensures the efficient storage of vast amounts of geospatial data and models, but also provides solid hardware support for complex computational tasks, ensuring a smooth and efficient inference process.

The data layer is the physical implementation of the cube organizational model based on the fact constellation schema. In this layer, the relational database PostgreSQL is responsible for storing dimension tables, fact tables, and model metadata tables, ensuring data structuring and ease of querying. The object storage MinIO is used for storing tile files and model files, optimizing the flexibility and scalability of data access. The non-relational database MongoDB is specifically used to store the features of model training datasets, with its flexible data model meeting the storage needs of complex data.

The computing layer is based on the distributed inference framework Ray. In terms of data, it provides functions such as cube querying, model quality evaluation, feature extraction, and nearest neighbor search. In terms of inference, it offers functions including model deployment, data preprocessing, model inference, and post-processing.

The application layer primarily provides three online inference service modes: Web GUI, open geospatial web services, and online programming IDE. The Web GUI is built using the React framework to create an intuitive and user-friendly web page that supports users in inputting inference conditions through various methods, such as spatial range selection, checkboxes, and dropdown menus. It also uses the Cesium component to visualize results on the map, significantly enhancing the user experience. The open geospatial web service standardizes and facilitates integration by offering a standard OGC API-Processes interface, making it easy for users to integrated inference service into external systems. Additionally, the online IDE module provides users with a professional online programming environment and a Python script library, enabling users to call inference services through scripts and visualize the computed results in real time. This further enhances the flexibility and scalability of the system.

Figure 6:
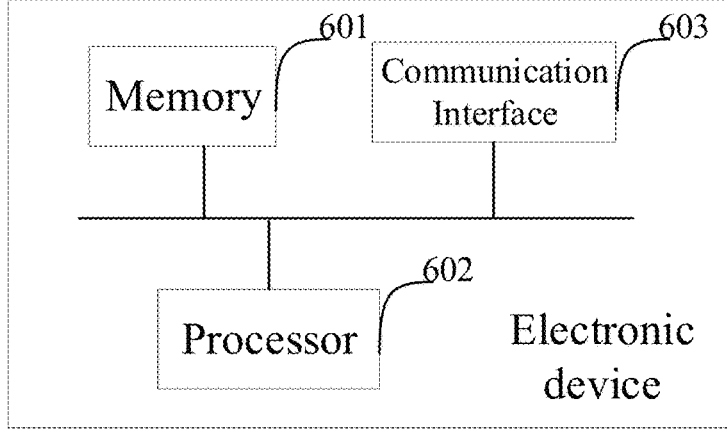
FIG. 6 is a structural diagram illustrating an electronic device according to an embodiment of the disclosure.

FIG. 6 is a schematic diagram of the structure of the electronic device provided in this embodiment. The electronic device can include: a memory 601, a processor 602, and a computer program stored in the memory 601 that can be executed on the processor 602. When the processor 602 executes the program, it implements the AI Cube-based online inference method provided in the above embodiment.

Furthermore, the electronic device also comprises: a communication interface 603, which is used for communication between the memory 601 and the processor 602. The memory 601 may include high-speed RAM (Random Access Memory) and may also include non-volatile memory, such as at least one disk storage device.

If the memory 601, processor 602, and communication interface 603 are independently implemented, the communication interface 603, memory 601, and processor 602 can be interconnected via a bus to complete communication between them. The bus can be an ISA (Industry Standard Architecture) bus, a PCI (Peripheral Component Interconnect) bus, or an EISA (Extended Industry Standard Architecture) bus, among others. The bus can be divided into an address bus, a data bus, and a control bus. For ease of representation, only a thick line is shown in FIG. 6, but this does not imply there is only one bus or one type of bus.

Optionally, in a specific implementation, if the memory 601, processor 602, and communication interface 603 are integrated into a single chip, they can communicate with each other through an internal interface.

The processor 602 may be a CPU (Central Processing Unit), an ASIC (Application-Specific Integrated Circuit), or one or more integrated circuits configured to implement one or more embodiments of the present application.

This embodiment of the disclosure also provides a computer-readable storage medium storing a computer program, which, when executed by a processor, implements the aforementioned AI Cube-based online inference method.

In this disclosure, references to terms such as "one embodiment," "some embodiments," "example," "specific example," or "certain examples" indicate that the specific features, structures, materials, or characteristics described in connection with the embodiment or example are included in at least one embodiment or example of the disclosure. The illustrative expressions of these terms in this disclosure do not necessarily refer to the same embodiment or example. Moreover, the described specific features, structures, materials, or characteristics may be combined in any suitable manner in one or more embodiments or examples. Furthermore, unless otherwise conflicting, those skilled in the art may combine and integrate different embodiments or examples described in this disclosure, as well as their respective features.

Furthermore, the terms "first" and "second" are used solely for descriptive purposes and should not be understood as indicating or implying relative importance or implicitly specifying the number of the referenced technical features. Thus, features designated as "first" and "second" may explicitly or implicitly include at least one of these features. In the description of this disclosure, the term "N" refers to at least two, such as two, three, and so on, unless explicitly defined otherwise.

Any process or method described in the flowchart or otherwise in this application can be understood as representing a module, segment, or portion of executable instructions comprising one or more steps for implementing customized logical functions or processes. The scope of the preferred embodiments of this disclosure also comprises alternative implementations in which functions may be performed in an order different from that shown or discussed, including execution in a substantially simultaneous manner or in reverse order, depending on the involved functionalities. This should be understood by those skilled in the relevant technical field of the embodiments of this disclosure.

It should be understood that various parts of this application can be implemented using hardware, software, firmware, or a combination thereof. In the above embodiments, the steps or methods can be implemented using software or firmware stored in a memory and executed by an appropriate instruction execution system. If implemented in hardware, as in another embodiment, it can be realized using any of the following well-known techniques or a combination thereof: discrete logic circuits with logic gates for implementing logical functions on data signals, application-specific integrated circuits (ASICs) with appropriate combinations of logic gates, programmable gate arrays, field-programmable gate arrays (FPGAs), etc.

A person of ordinary skill in the art can understand that all or part of the steps in the above-described embodiments can be executed by instructing relevant hardware through a program. The program can be stored on a computer-readable storage medium, and when executed, it comprises one or a combination of the steps in the method embodiments.

Although the above embodiments of this application have been illustrated and described, it should be understood that these embodiments are merely exemplary and should not be construed as limiting this application. Those skilled in the art may make variations, modifications, substitutions, and alterations to the above embodiments within the scope of this disclosure.

What is claimed is:

1. An AI Cube-based online inference method, comprising the following steps:

establishing a cube organizational model based on a spatiotemporal grid, wherein the cube organizational model integrates and manages spatiotemporal data and Geospatial Artificial Intelligence (GeoAI) models in a unified manner based on spatiotemporal references;

performing a task-to-model matching based on a combination of an explicit matching and an implicit matching, wherein the explicit matching refers to converting a user's inference request into multidimensional query conditions of the cube organizational model to retrieve a candidate model set, and the implicit matching refers to performing a model matching by calculating a feature similarity between a tile to be inferred and candidate models; the task-to-model matching based on the combination of the explicit matching and the implicit matching comprises: acquiring an inference request input by a user, wherein the inference request comprises a task type, a classification category, a spatial range, a spatial resolution, and a temporal range; converting the user's inference request into dimensional query conditions, performing dimensional query based on the dimensional query conditions and the cube organizational model, and returning result sets, wherein the result sets comprise tile data under the spatiotemporal grid and a list of models available for a current inference task; calculating a comprehensive quality of each of the models in a model list, and selecting the models whose the comprehensive quality exceeds a given threshold as the candidate models, if the candidate models have no training dataset information, a model with the highest comprehensive quality and the tile data are selected as an optimal combination under the spatiotemporal grid; if the candidate models are associated with the training dataset information, the implicit matching is performed for the candidate models, for each of tile data, a corresponding model is traversed to calculate a similarity between the tile data and each of the models, and the model with the highest similarity is selected as a final model; for different tile data under the same spatiotemporal grid, a set of the tile data and a model with the highest model quality is selected as a final combination under a corresponding grid; an evaluation of a model quality takes into account a comprehensive consideration of model performance P, computational complexity C, and generalization capability G, a formula for calculating the overall quality Q is as follows:

$$Q = G \times \left( P \times \text{weight}_p - \left( \frac{C - C_{min}}{C_{max} - C_{min}} \right) \times \text{weight}_c \right)$$

wherein, P is a F1 score index, C is a GFLOPs index, $C_{max}$ is a maximum C among the candidate models, $C_{min}$ is a minimum C among the candidate models, $\text{weight}_p$ is a computation weight of P, and $\text{weight}_c$ is a computation weight of C;

performing a distributed inference workflow on the tile data to be inferred using an AI model based on a distributed inference framework, wherein the tile data to be inferred is converted into distributed memory objects, and the AI model is deployed on various computing nodes to perform an inference workflow in parallel on the tile data to be inferred, wherein the distributed inference framework comprises a Ray framework, wherein the distributed inference workflow based on the Ray framework comprises reading of cube tile data, converting to memory objects, tile feature extraction, and the implicit matching, pre-processing of the tiles to be inferred, distributed inference, and post-processing, wherein, the reading of the cube tile data and the implicit matching are performed in parallel based on multi-core CPUs, while the tile feature extraction, pre-processing of the tiles to be inferred, and distributed inference are performed in parallel based on a plurality of GPUs, to avoid exceeding hardware memory limitations, each of processing is performed in batches, with a maximum number of tiles determined by an available memory capacity of the CPUs or the plurality of GPUs;

an inference workflow automatically applies different pre-processing and post-processing steps based on different inference task, for semantic segmentation tasks, the pre-processing comprises a mean normalization and a standard deviation normalization, the post-processing comprises color mapping and stitched edge smoothing, for object detection tasks, the pre-processing is the same as that for semantic segmentation, and the post-processing comprises removing duplicate detection boxes based on a weighted box fusion.

2. The AI Cube-based online inference method according to claim 1, wherein the spatiotemporal data undergoes reprojection, resampling, and tiling operations before being ingested into the cube, the cube organizational model comprises dimension tables and fact tables, the fact table stores tile information and model information, the tile information comprises dimension indices, file paths where the tiles are located, the byte size of the tiles, and byte offsets, the model information comprises the dimension indices and IDs of model metadata records; the dimension tables describe temporal and spatial attributes of tile facts, associated products, contained spectral bands, applicable temporal and spatial ranges of model facts, supported input data products and bands, applicable tasks and relevant classification categories.

3. An electronic device, comprising a memory, a processor, and a computer program stored in the memory and executable on the processor, wherein the processor executes the program to implement an AI Cube-based online inference method according to claim 2.

4. A computer-readable storage medium storing a computer program or instructions, wherein the computer program or the instructions are executed to implement an AI Cube-based online inference method according to claim 2.

5. The AI Cube-based online inference method according to claim 1, wherein the implicit matching of the candidate models comprises:

traversing a training dataset of the models and using a pre-trained deep learning model to extract feature vectors of each of samples, extracted features represent a comprehensive description of texture, color, and semantics of the samples, a feature is a d-dimensional vector, performing a hash mapping for each of the feature vectors to construct a feature library, where a hash function used conforms to a locality-sensitive hash function;

for each of result sets, using a pre-trained model to extract the feature vectors of the tile data, and then traversing the model list, for each of the models, calculating a hash value of the feature vectors of the tile data using a corresponding hash function, finding a sample with the same hash value in the feature library, and calculating a feature distance between the tile data and the samples;

when the feature distance exceeds a threshold, the samples are identified as similar samples to the tile data, a proportion of the similar samples in an entire training dataset is then calculated, and a model with the highest proportion is selected as an optimal model for a current tile data.

6. An electronic device, comprising a memory, a processor, and a computer program stored in the memory and executable on the processor, wherein the processor executes the program to implement an AI Cube-based online inference method according to claim 5.

7. A computer-readable storage medium storing a computer program or instructions, wherein the computer program or the instructions are executed to implement an AI Cube-based online inference method according to claim 5.

8. The AI Cube-based online inference method according to claim 1, wherein further comprises:

providing a GUI, service interfaces, and a service interface, the GUI allows the user to interactively input inference conditions on a preset webpage and provides on-the-fly inference mode and batch inference mode, the service interface allows external programs to access data services and inference services provided by an integrated system, wherein the on-the-fly inference mode performs an inference on tile data within a spatial zoom and range of a current viewport, each time the user zooms or pans a map, a new inference is triggered, a batch mode allows the user to perform inference tasks on large-scale data and allows the user to export inference results based on predefined spatiotemporal ranges and resolutions.

9. An electronic device, comprising a memory, a processor, and a computer program stored in the memory and executable on the processor, wherein the processor executes the program to implement an AI Cube-based online inference method according to claim 8.

10. A computer-readable storage medium storing a computer program or instructions, wherein the computer program or the instructions are executed to implement an AI Cube-based online inference method according to claim 8.

11. An electronic device, comprising a memory, a processor, and a computer program stored in the memory and executable on the processor, wherein the processor executes the program to implement an AI Cube-based online inference method according to claim 1.

12. A computer-readable storage medium storing a computer program or instructions, wherein the computer program or the instructions are executed to implement an AI Cube-based online inference method according to claim 1.

13. An AI Cube-based online inference service system, wherein comprises:

a data module, configured to establish a cube organizational model based on spatiotemporal grids, wherein the cube organizational model integrates and manages spatiotemporal data and Geospatial Artificial Intelligence (GeoAI) models in a unified manner based on spatiotemporal references;

a matching module, configured to perform a task-to-model matching based on a combination of an explicit matching and an implicit matching, wherein the explicit matching refers to converting a user's inference request into multidimensional query conditions of the cube organizational model to retrieve a set of candidate models, and the implicit matching refers to performing a model matching by calculating a feature similarity between a tile to be inferred and the candidate models;

the task-to-model matching based on the combination of the explicit matching and the implicit matching comprises: acquiring an inference request input by a user, wherein the inference request comprises a task type, a classification category, a spatial range, a spatial resolution, and a temporal range; converting the user's inference request into dimensional query conditions, performing a dimensional query based on the dimensional query conditions and the cube organizational model, and returning a result set, wherein the result set comprises tile data under the spatiotemporal grid and a list of models available for a current inference task; calculating a comprehensive quality of each of the models in a model list, and selecting models whose the comprehensive quality exceeds a given threshold as the candidate models, if the candidate models have no training dataset information, a model with the highest comprehensive quality and the tile data are selected as an optimal combination under the spatiotemporal grid; if the candidate models are associated with the training dataset information, the implicit matching is performed for the candidate model, for each tile data, a corresponding model is traversed to calculate a similarity between the tile data and each model, and the model with the highest similarity is selected as a final model, for different tile data under the same spatiotemporal grid, a set of tile data and a model with a highest model quality is selected as a final combination under a corresponding grid, an evaluation of a model quality takes into account a comprehensive consideration of model performance P, computational complexity C, and generalization capability G, a formula for calculating the overall quality Q is as follows:

$$Q = G \times \left( P \times \text{weight}_p - \left( \frac{C - C_{min}}{C_{max} - C_{min}} \right) \times \text{weight}_c \right)$$

wherein, P is a F1 score index, C is a GFLOPs index, $C_{max}$ is a maximum C among the candidate models, $C_{min}$ is a minimum C among the candidate models, $\text{weight}_p$ is a computation weight of P, and $\text{weight}_c$ is a computation weight of C;

an application module, configured to perform a distributed inference workflow on the tile data to be inferred using an AI model based on a distributed inference framework, wherein the tile data to be inferred is converted into distributed memory objects, and the AI model is deployed on multiple computing nodes to execute an inference workflow in parallel on the tile data to be inferred, wherein the distributed inference framework comprises a Ray framework, wherein the distributed inference workflow based on the Ray framework comprises reading of cube tile data, converting to memory objects, tile feature extraction, and the implicit matching, pre-processing of the tiles to be inferred, distributed inference, and post-processing, wherein, the reading of the cube tile data and the implicit matching are performed in parallel based on multi-core CPUs, while the tile feature extraction, pre-processing of the tiles to be inferred, and distributed inference are performed in parallel based on a plurality of GPUs, to avoid exceeding hardware memory limitations, each of processing is performed in batches, with a maximum number of tiles determined by an available memory capacity of the CPUs or the plurality of GPUs;

an inference workflow automatically applies different pre-processing and post-processing steps based on different inference task, for semantic segmentation tasks, the pre-processing comprises a mean normalization and a standard deviation normalization, the post-processing comprises color mapping and stitched edge smoothing, for object detection tasks, the pre-processing is the same as that for semantic segmentation, and the post-processing comprises removing duplicate detection boxes based on a weighted box fusion.

*    *    *    *    *